E. P. MORSE.
CALENDARS.
No. 188,656. Patented March 20, 1877.
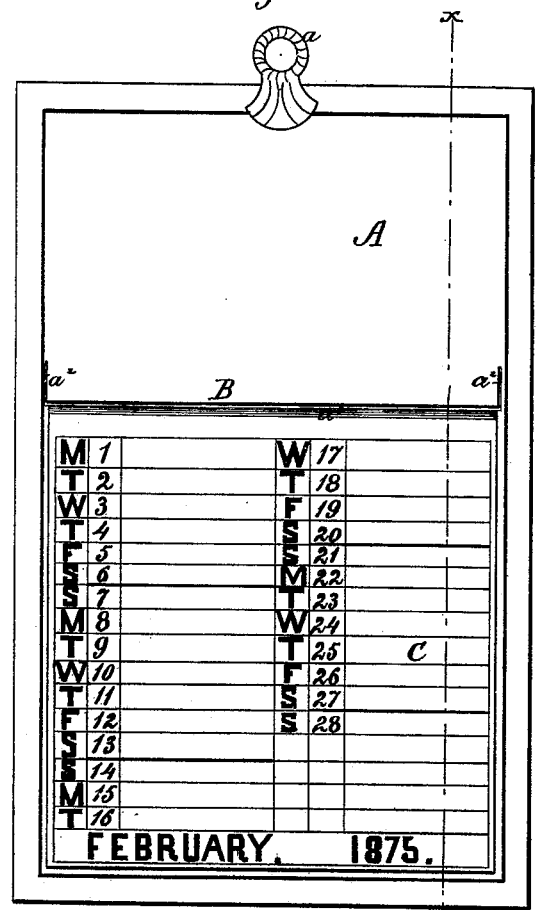
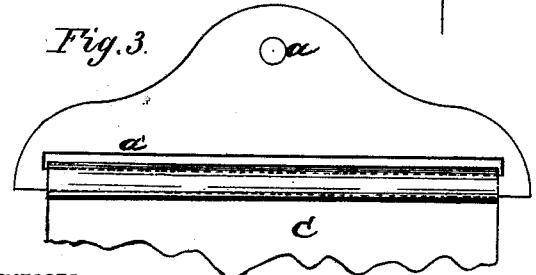
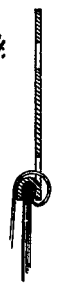
WITNESSES:
W. W. Hollingsworth
Colon C. Kernon
INVENTOR:
E. P. Morse
BY
ATTORNEYS.

UNITED STATES PATENT OFFICE.

EDWARD P. MORSE, OF BATAVIA, NEW YORK, ASSIGNOR TO HIMSELF, GEORGE BOWEN, HORACE M. WARREN, AND HIRAM CHADDOCK, OF SAME PLACE.

IMPROVEMENT IN CALENDARS.

Specification forming part of Letters Patent No. 188,656, dated March 20, 1877; application filed January 8, 1877.

*To all whom it may concern:*

Be it known that I, EDWARD P. MORSE, of Batavia, in the county of Genesee and State of New York, have invented a new and Improved Memorandum-Calendar; and I do hereby declare that the following is a full, clear, and exact description of the same, reference being had to the accompanying drawing, forming a part of this specification, in which—

Figure 1 is a front view. Fig. 2 is a transverse section through line $x\,x$, Fig. 1. Fig. 3 exhibits a modification.

The invention will first be fully described in connection with all that is necessary to a full understanding thereof, and then pointed out in the claim.

A represents a paper card-board, having the top ring $a$, by which it may be hung, and a slit, $a^1$, connecting with two right-angled ones, $a^2\,a^2$. These make a tongue or flap, B, which can be pushed aside or lifted with the finger. Near the top of slit $a^1$ I paste or otherwise fasten twelve monthly calendars, C, the top one being that for January, and the others following successively in the order of the months, ending with December.

It will be observed that to the right of each day of the months is a line, on which may be noted any desired memorandum. After a month has been passed each paper is turned up, passed through slit $a^1$, and held on the opposite side of card-board for future reference. When the whole year has elapsed the slit $a^1$ may be extended or cut out on each side, thus separating the aggregate of monthly calendars, and leaving them together and in a suitable form for reference, as well as for being filed away; or I may make the slit $a^1$ in the enlarged plate A', that is provided with a top aperture, by which it can be hung to a nail; or I may omit the slit in card-board, and make the opening $a$ behind the plate B', which is bent together in one direction, so as to bite upon and hold fast to the calendars C, and in the opposite direction at each end, so as to pierce and clamp the plate to the card-board.

Having thus described my invention, what I claim as new is—

A memorandum having monthly calendars C, fastened at their upper edges, near an opening, $a^1$, to allow them to be turned over, and made to hang in regular order behind one another, as shown and described, for the purpose specified.

EDWARD P. MORSE.

Witnesses:
 LOREN GREENE,
 JAMES HOGAN.